F. A. JIMERSON.
CRANK BEARING FOR CLOSE CORNER DRILLS.
APPLICATION FILED APR. 29, 1918.
1,293,792.  Patented Feb. 11, 1919.
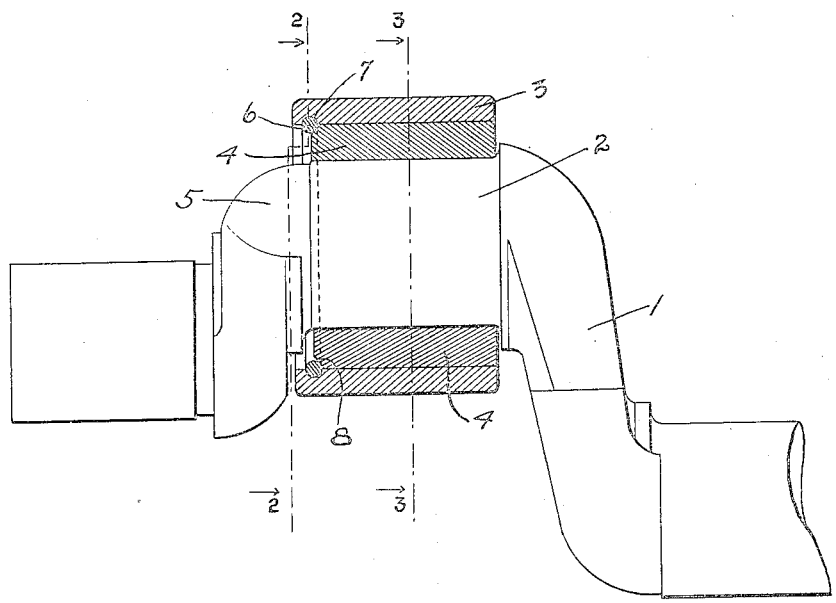
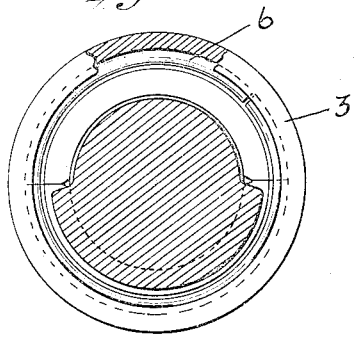
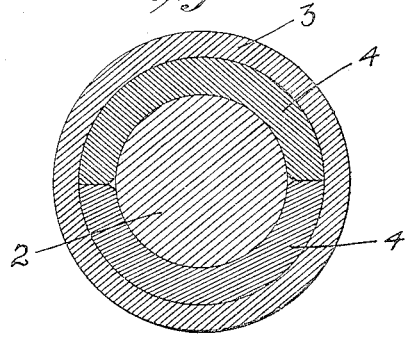

UNITED STATES PATENT OFFICE.

FRANCIS A. JIMERSON, OF ATHENS, PENNSYLVANIA, ASSIGNOR TO INGERSOLL-RAND COMPANY, OF JERSEY CITY, NEW JERSEY, A CORPORATION OF NEW JERSEY.

CRANK-BEARING FOR CLOSE-CORNER DRILLS.

1,293,792.      Specification of Letters Patent.      Patented Feb. 11, 1919.

Application filed April 29, 1918. Serial No. 231,362.

*To all whom it may concern:*

Be it known that I, FRANCIS A. JIMERSON, a citizen of the United States, residing at Athens, in the county of Bradford and State of Pennsylvania, have invented a certain new and useful Improvement in Crank-Bearings for Close-Corner Drills, of which the following is a specification.

This invention relates to rotating bearings and particularly to rotating bearings adapted to be used in connection with the multiple throw crank shafts of rotating tools operated by fluid pressure, such as drills and the like.

The objects of the invention are to provide a rotating bearing that may be readily assembled in the restricted space available in a pneumatic tool of the above type that will be simple and efficient and readily retained in place.

With these and other objects in view, my invention consists in the features of construction and operation described in the following specification and illustrated in the accompanying drawings, forming a part hereof, in which—

Figure 1 shows a longitudinal view of the crank shaft with one of the bearings in place, shown in cross section;

Fig. 2, a view taken on the line 2—2 of Fig. 1; and

Fig. 3, a view taken on the line 3—3 of Fig. 1.

Referring more particularly to the drawings, 1 refers to a crank shaft such as is commonly used in machines of the class shown in a prior patent granted to me under date of February 5th, 1918, No. 1,255,315. Each of the rotating crank journals 2 which reciprocate and rotate within the slotted portions of the oscillating arms as shown in the above mentioned patent is provided with a suitable bearing made in accordance with the present invention, in order to maintain the friction of the rotating and sliding parts at a minimum. The annular bearing sleeve 3 is in direct contact with the slotted portion of one of the oscillating arms and in order to permit it to rotate easily and without appreciable friction upon the crank journal 2 as the crank 1 rotates, bushings 4 are provided intermediate the crank journal 2 and sleeve 3. These are preferably made of bronze or other suitable material having a low coefficient of friction.

In assembling the sleeve 3 over the crank and journal 2 the sleeve 3 is slipped over the crank which is forged or otherwise shaped to suitable form to permit this, the sleeve 3 being made large enough in diameter to accomplish this even when used with a crank shaft having a plurality of journals 2. To permit inserting the bushings 4 within the sleeve and in place upon the crank journal the shoulder of the crank is milled off sufficiently as shown at 5 to permit one of the half-circular bushings 4 to be slid into its place after which the sleeve 3 may be rotated a half turn together with the bushing already inserted and the other semi-circular bushing inserted in a similar manner, thus completely filling the annular space between the journal 2 and sleeve 3 with a freely rotatable bearing.

To hold the bushings 4 in place within the sleeve 3 a spring 6 is provided which is snapped into place within a recess 7 in the sleeve 3 and fitted against a chamfered portion 8 of the bushings 4.

It is to be understood that the present showing and description disclose only one specific embodiment of the present invention and that other forms and modifications are included within the spirit and scope of the invention, as expressed in the appended claims.

What I claim is:

1. In a bearing for crank pins, a pair of semi-cylindrical bushings fitting the crank pin, a cylindrical sleeve surrounding said bushings and a ring fitted within said sleeve and against said bushings to retain said bushings in place upon the crank pin.

2. In a bearing for crank pins, a pair of semi-cylindrical bushings fitting the crank pin, a cylindrical sleeve surrounding said bushings, said sleeve being provided with a recess and a ring fitted within said recess and engaging said bushings to retain them in place upon the crank pin.

3. In a bearing for crank pins, a pair of semi-cylindrical bushings fitting the crank pin, a cylindrical sleeve surrounding said bushings, said sleeve being provided with a recess and said bushings being chamfered at one end and a ring fitting said recess and engaging said chamfered portion of said bushings to retain them in place upon the pin.

In testimony whereof, I have hereunto set my hand.

FRANCIS A. JIMERSON.